(12) United States Patent
Kilmer

(10) Patent No.: US 7,255,932 B1
(45) Date of Patent: Aug. 14, 2007

(54) ULTRA-LONGLIFE, HIGH FORMABILITY BRAZING SHEET

(75) Inventor: Raymond J. Kilmer, Lancaster, PA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 10/417,830

(22) Filed: Apr. 17, 2003

Related U.S. Application Data

(60) Provisional application No. 60/373,829, filed on Apr. 18, 2002.

(51) Int. Cl.
*B32B 15/20* (2006.01)

(52) U.S. Cl. .................. 428/654; 165/905; 228/262.51

(58) Field of Classification Search ................ 428/654, 428/933; 228/262.52, 56.3
See application file for complete search history.

(56) References Cited

U.S. PATENT DOCUMENTS

| | | | |
|---|---|---|---|
| 2,821,014 A | 1/1958 | Miller | 29/197.5 |
| 4,489,140 A * | 12/1984 | Pulliam et al. | 428/654 |
| 4,586,964 A | 5/1986 | Finnegan et al. | 148/11.5 |
| 5,037,707 A | 8/1991 | Fortin et al. | 428/654 |
| 5,041,343 A | 8/1991 | Fortin et al. | 428/654 |
| 5,476,725 A | 12/1995 | Papich et al. | 428/654 |
| 6,555,251 B2 | 4/2003 | Kilmer | 428/654 |
| 6,627,330 B1 * | 9/2003 | Shimizu et al. | 428/654 |
| 2002/0037426 A1 * | 3/2002 | Yamada et al. | 428/654 |

FOREIGN PATENT DOCUMENTS

| | | | |
|---|---|---|---|
| EP | 0799667 A1 * | 10/1997 | |
| JP | 64-040195 | * | 2/1989 |
| JP | 01-208432 | * | 8/1989 |
| JP | 02-030394 | * | 1/1990 |
| JP | 11-241132 | * | 9/1999 |

* cited by examiner

Primary Examiner—John J. Zimmerman
(74) Attorney, Agent, or Firm—Greenberg Traurig LLP; Harry A. Hild, Jr.

(57) ABSTRACT

The present invention relates to multiple layer aluminum brazing sheet having a core, a braze cladding, and an interliner therebetween that, when fabricated in the fully annealed condition (O-temper), forms a continuous and dense dispersoid band in the core in addition to having an additional sacrificial layer for exceptional post brazed corrosion resistance. This present invention also relates to the process used to fabricate these alloys.

32 Claims, 8 Drawing Sheets

As Produced

As Produced

0% Stretch

0% Stretch

2% Stretch

2% Stretch

4% Stretch

4% Stretch

6% Stretch

6% Stretch

8% Stretch

8% Stretch

10% Stretch

10% Stretch

12% Stretch

12% Stretch

14% Stretch

ULTRA-LONGLIFE, HIGH FORMABILITY BRAZING SHEET

RELATED APPLICATION

This application claims the benefit of U.S. Provisional Application Ser. No. 60/373,829, filed Apr. 18, 2002, entitled "Ultra-Longlife, High Formability Brazing Sheet".

FIELD OF THE INVENTION

This invention relates to brazing sheet with high corrosion resistance in a fully annealed "O" temper and to the process for making such products. More particularly, it relates to multiple layer alloy products for applications requiring a high degree of formability in concert with post brazed corrosion resistance.

BACKGROUND OF THE INVENTION

Brazing sheet commonly includes a core alloy bonded to a silicon-containing brazing alloy. External corrosion resistance is a concern common to many brazed aluminum heat exchangers. For example, most brazed aluminum plate type evaporators have a coating applied to the brazed assemblies to aid in corrosion protection. Commonly this is a hexavalent chromate based coating. These coatings are recognized as the industry standard from a corrosion resistance standpoint but hexavalent chromium is a carcinogen and many countries are banning its use in the near future. Hence the necessity for a highly corrosion resistant base aluminum material is now greater than ever.

The use of an interlayer as a means of alleviating intergranular corrosion problems from penetration of Si into the core alloy of brazing sheet and minimizing localized melting of the core alloy is well documented. U.S. Pat. No. 2,821,014 to Miller describes use of an interliner to avoid in very substantial measure any penetration and resultant weakening of a core alloy by a brazing filler metal. Retention of the core alloy after brazing is generally recognized as an important consideration in the determination of post-brazed corrosion resistance. U.S. Pat. No. 4,586,964 to Finnegan et al. describes a procedure including a full anneal followed by cold working of a 3xxx series core alloy (i.e., an —H1X temper) to improve post brazed corrosion resistance. The introduction of cold working after a full anneal can result in recrystallization of the core alloy which itself provides greater general resistance to Si penetration and localized erosion during the braze cycle.

The above approaches recognize that Si diffusion into the core can have deleterious effects on corrosion resistance. Neither of the approaches, by themselves, identify highly corrosion resistant, long-life products.

An approach to achieving substantially improved corrosion resistance is documented in U.S. Pat. Nos. 5,037,707 and 5,041,343, both to Fortin et al. These patents describe the use of a low Si containing (less than 0.15 wt. %) 3xxx series core alloy, fabricated to final gauge without benefit of a substantial homogenization or interannealing practice, bonded directly to a 4xxx series braze cladding containing 1–15 wt. % Si. A manganese bearing dispersoid band is described as developing within the core at a core/cladding interfacial region after the brazing cycle due to the localized diffusion of Si from the 4xxx braze cladding. The Si reduces the local solubility of Mn and precipitation of the Mn—Si dispersoids (e.g., $Al_{12}(Fe,Mn)_3Si$ dispersoids) results in the interfacial region of Si diffusion. These Si containing dispersoids are resistant to reversion during the brazing cycle. The interfacial region becomes depleted in Mn in solid solution relative to the underlying core alloy. Corrosion attack is described as occurring preferentially within the band of precipitates before the main alloy body is attacked. Example 3 of these patents demonstrates that once the main body is attacked, corrosion occurs quite rapidly through the 3xxx core, perforating in less than 48 hours. The processes for fabricating products that are back annealed (referred to in the industry as —H2X type tempers) and fully annealed (referred in the industry as —O tempers) with corresponding annealing temperatures are also outlined.

Alloys relying on the precipitation of dense Mn bearing (e.g., $Al_{12}(Fe,Mn)_3Si$) dispersoids for extended corrosion resistance have found broad commercial applications for products having minimal formability requirements (i.e., in —HXX tempers), for example in radiator and heater tube applications. However, the practice described in U.S. Pat. No. 5,041,343 has not found commercial acceptance for fully annealed tempers as these alloys are susceptible to localized erosion of the core alloy when subjected to levels of cold working insufficient to result in recrystallization of the core prior to melting of the braze cladding. Fully annealed O-tempers are commonly specified for applications requiring significant formability and hence the material will be subjected to widely varying degrees of cold work during the forming operation. As a result of this localized melting (also termed "erosion") of the core, the formation of a dense dispersoid band in the core alloy adjacent to the cladding is largely compromised. Furthermore, the braze cladding flow is poor as a result of the enrichment of aluminum from the core alloy into the braze cladding. The net result is poor brazeability and poor corrosion behavior. The problems with localized erosion in fully annealed tempers in these alloys (i.e., alloys where the core alloy does not receive a homogenization and is bonded directly to a 4xxx braze cladding) is well documented in the literature.

As a result of the problems associated with localized erosion and its compromising effects on the development of a consistent and continuous dispersoid band, the 3xxx core alloy of O-temper brazing sheet products almost universally receives a homogenization treatment. This homogenization treatment coarsens the size of the average Mn bearing dispersoid and influences the number and size distribution of the Mn bearing dispersoids in the core alloy with the net result of promoting the ease of recrystallization and/or recovery of the core during the brazing cycle. After homogenization, there are fewer small Mn particles that can revert during the braze cycle, significantly lowering the Mn levels in solid solution. This helps to alleviate localized erosion in formed parts but largely mitigates the development of a dense and continuous dispersoid band as an effective means of corrosion protection.

Hence there exists a need for an alloy and process to produce an alloy that is supplied in a fully annealed temper, can be subjected to a broad spectrum of forming strains, can be exposed to a brazing event and subsequently develops a continuous, dense dispersoid band with minimal erosion of the core alloy. Furthermore there exists a need for an alloy that retains a high inherent corrosion resistance even after the dispersoid band region corrodes away. There also is a need for products produced from O-temper brazing sheet to have exceptional corrosion resistance particularly for use in non-chromate coated brazed heat exchangers.

SUMMARY OF THE INVENTION

The present invention relates to a multiple layer aluminum brazing sheet having an Aluminum Association (AA) 3xxx alloy core, an AA 4xxx alloy braze cladding, and an aluminum alloy interliner therebetween that, when fabricated in the fully annealed condition (O-temper), can be subjected to a broad spectrum of strains during the forming operation, be brazed to a component and subsequently forms a generally continuous and dense dispersoid band in the core in addition to having an additional sacrificial layer (i.e., the interliner) along with elevated Ti additions to the core for exceptional post brazed corrosion resistance. The present invention also relates to the process used to fabricate this sheet. The brazing sheet may be a fully annealed temper and the interliner may be electrochemically more negative than the core alloy.

The 3xxx core is clad with a thin (up to about 60 μm) interliner and a 4xxx braze cladding. This arrangement allows for interdiffusion of Si from the 4xxx braze cladding through the interliner to the 3xxx core during a process of brazing a component to the sheet, resulting in the generation of a continuous dense Mn containing dispersoid band within the core at the interface between the core and the interliner (hereinafter the core/interliner interface). The optimum thickness range of the interliner depends on the braze cycle being employed as diffusion is time and temperature dependent; longer braze cycles and/or higher brazing temperatures allow for thicker interliners. Conversely, shorter braze cycles and/or lower brazing temperatures allow for thinner interliners to be used. The core alloy does not receive a thermal treatment (homogenization or a treatment above about 525° C. such as in a re-heat for roll, interanneal or final anneal) prior to being subjected to a brazing event.

The core may be clad on the opposing face with a 1xxx, 3xxx, 5xxx, 6xxx, or 7xxx alloy or an interliner may be employed on both sides of the 3xxx core, with each interliner being of similar thickness and composition or purposefully different composition and/or thickness. The opposing face of the 3xxx core may be bonded to an interliner thicker than about 60 μm at final gauge which largely mitigates the formation of a Mn containing dispersoid band after the brazing event. This composition of this interliner may also purposefully selected to promote precipitation of strengthening particles after brazing and aging.

The present invention also includes a process of producing a corrosion resistant aluminum brazing sheet product including steps of (a) producing a composite of an aluminum alloy interliner sandwiched between a 4xxx alloy braze cladding and a 3xxx alloy core; (b) hot rolling the composite below about 525° C. to metallurgically bond the components of the composite together; and (c) cold rolling the composite to final gauge without exposure to a thermal treatment. The step of producing a composite may involve casting the braze cladding, the interliner and the core alloys as separate ingots, hot rolling the 4xxx braze cladding and interliner ingots to the appropriate plate thickness and arranging the core ingot and plates as the composite. Alternatively, the composite may be produced by simultaneously casting the core alloy and the braze cladding alloy on opposing sides of a solid interliner. In another embodiment, the composite is produced by continuously casting the core alloy against the interliner, the interliner being pre-bonded to the braze cladding. The brazing sheet is then rolled to final gauge and is partially annealed to an —H temper or —O temper. Upon brazing of a component to the sheet (referred to herein as a brazing event), a dense band of Mn containing dispersoids forms in the core at the core/interliner interface.

The final brazed component may be age hardenable due to the interdiffusion of solute (primarily Mg, Si, and Cu) in the interliner and core. Post-brazed and aged tensile yield strengths above 65 MPa and ultimate tensile strengths above 165 MPa have been observed for the brazing sheet of the present invention.

DETAILED DESCRIPTION OF PREFERRED EMBODIMENTS

All component percentages herein are by weight percent unless otherwise indicated. As used herein, the term "substantially free" means that no purposeful additions of that alloying element were made to the composition, but that due to impurities and/or leaching from contact with manufacturing equipment, trace quantities of such elements may, nevertheless, find their way into the final alloy product.

When referring to any numerical range of values, such ranges are understood to include about each and every number and/or fraction between the stated range minimum and maximum. A range of about 0.5 to about 1.6 wt. % Mn, for example, would expressly include all intermediate values of about 0.46, 0.47, 0.48, all the way up to and including 1.61, 1.62, 1.63 and 1.64 Mn. The same applies to each other numerical property, relative thickness and/or elemental range set forth herein.

The present invention relates to a multiple layer aluminum brazing sheet that, when fabricated in a fully annealed condition (O-temper) and subjected to a brazing event, forms a generally continuous and dense dispersoid band in addition to having an additional sacrificial layer (i.e., the interliner) along with elevated Ti additions in the core alloy for exceptional post brazed corrosion resistance. The present invention also relates to processes for fabricating this sheet.

Figure 1A:
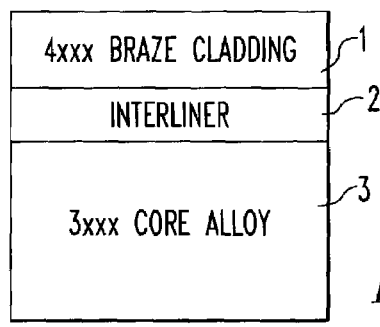
FIGS. 1a, 1b and 1c are each a schematic diagram showing the various embodiments of the invention.
Figure 1B:
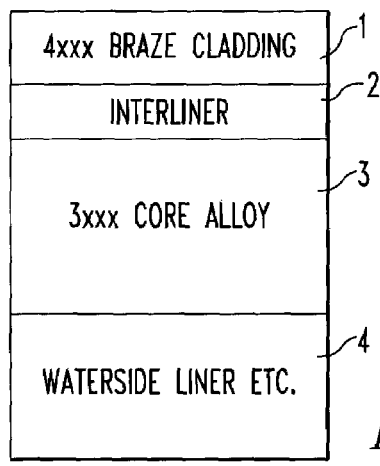
Figure 1C:
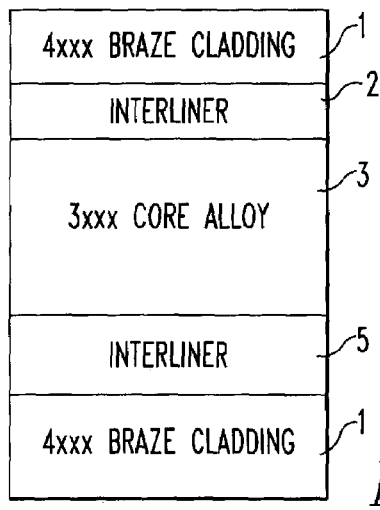

Referring to FIG. 1, the brazing sheet may be a three, four or five layered product including a 4xxx braze cladding 1, a nonhomogenized 3xxx core 3 and an interliner 2 therebetween. A three layered product (FIG. 1a) includes a core 3 bonded to an interliner 2, bonded to a 4xxx braze cladding 1. A four layered product (FIG. 1b) includes a core 3 bonded on one side to a non braze cladding (e.g., a waterside liner) 4 composed of an AA 1xxx, 3xxx, 5xxx, 6xxx, 7xxx or 8xxx alloy with the other side of the core 3 bonded to an interliner 2 which in turn is bonded to a 4xxx braze cladding 1. A five layered product (FIG. 1c) includes a core 3 bonded to interliners 2 and 5 on both sides thereof with a 4xxx braze cladding 1 bonded to each of the interliners 2 and 5.

The alloy of the core 3 used in the product of the invention is an aluminum based alloy containing no more than about 0.18 wt. % Si, no more than about 0.8 wt. % Fe, from about 0.5 wt. % to about 1.6 wt. % Mn, up to about 1 wt. % Cu, up to about 0.3 wt. % Cr, from about 0.01 to about 1.5 wt. % Mg, and up to about 0.25 wt. % Ti. Alternatively, the core alloy may be an aluminum alloy containing no more than about 0.08 wt. % Si, no more than about 0.7 wt. % Fe, from about 1 wt. % to about 1.5 wt. % Mn, from about 0.2 wt. % to about 0.8 wt. % Cu, from about 0.01 to about 1.5 wt. % Mg and optionally about 0.1 wt. % to about 0.25 wt. % Ti. The Mg level of the core is largely determined by the brazing method employed (vacuum or controlled atmosphere brazing (using flux) referred to as CAB), the flux used (standard Nocolock type or more Mg tolerant flux e.g., Cs-containing fluxes) and the strength level desired. Superior corrosion resistance is obtained with alloys containing elevated Ti additions). The effect of Ti on corrosion resistance of 3xxx alloys in general is well documented. Elevated Ti additions alter the mode of attack in the underlying core (the core 3 largely unaffected by Si diffusion from the 4xxx braze cladding 1 during the braze cycle) and are important at extending corrosion lifetime if the sacrificial regions (residual interliner and dispersoid band regions) no longer protect the underlying core 3. As such, additions of up to about 0.25 wt. % Ti may be included in the core alloy with additions of about 0.1 wt. % to about 0.25 wt. % Ti being preferred. The use of Cr is optional but should generally be kept at a level such that Mn+Cr+Ti is less than about 1.4 wt. % (e.g., up to about 0.3 wt. %). The use of Zr is optional at up to about 0.25 wt. % (e.g., from about 0.02 wt. % to about 0.25 wt. % Zr). The use of Ag is optional from 0.01 to 1.0 wt. %.

The core 3 may be cast via a DC (direct chill) process or may be created by a variety of methods including but not limited to continuous casting (roll casting, slab casting, belt casting etc), or via an extrusion process and the like. It is important that the fabrication practice be such as to minimize the amount of time the material is exposed to temperatures above 350° C. and avoid exposure of the material to temperatures above 540° C.

As stated herein, by the absence of a thermal treatment (of the components of the brazing sheet or of the brazing sheet itself prior to being subjected to a brazing event) is meant the absence of a homogenization treatment and the absence of a thermal treatment above about 525° C. in a process such as a re-heat for rolling, interanneal or final anneal or the like. By avoiding such high temperature treatments, Mn in the core remains in solution. While it is explicitly stated herein that the core alloy does not receive a thermal treatment (homogenization, interanneal or final anneal) greater than 525° C. during processing, short duration interanneals or final anneals (i.e., a "flash" anneal, also referred to as a continuous anneal) involving rapid heating rates (above 50° C./sec) resulting in metal temperatures above 260° C. for times below 30 minutes in duration are allowed as they do not constitute as a thermal treatment. If the metal temperature were to reach above 525° C. for a short duration (less than about 15 minutes above 525° C.) this would not constitute a thermal treatment. In general, the brazing sheet of the present invention preferably is subjected to hot rolling and annealing temperatures less than about 485° C. and annealing hold periods of less than about 10 hours.

The selection of interliner thickness and composition is important in achieving the desired post braze corrosion resistance and strength. In a product containing two interliners (FIG. 1c), it should be noted that the chemistry and thickness the interliners may be purposefully different from each other. The interliner 2 on the face of the core 3 requiring the formation of a dispersoid band for high external corrosion resistance should be thin enough to allow for Si diffusion during the braze cycle from the 4xxx braze cladding 1 (and potentially from the interliner 2) to the underlying core 3, yet thick enough to resist localized erosion from the molten braze cladding 1. Furthermore the resistance to localized erosion of the interliner 2 must be high, particularly when strained (i.e., worked as a result of a forming operation) to levels below those which promote recrystallization of the underlying core 3 during the subsequent brazing event. If the strain levels from the pre-braze forming operation are high enough to result in local recrystallization of the core 3, the issue of minimum interliner thickness is moot as the underlying core is generally resistant to localized erosion. It is recognized that working the material, particularly drawing or stretching operations prior to brazing, results in localized thinning of the brazing sheet with concomitant thinning of the interliner. As such, the final interliner thickness of the formed material will vary throughout the worked part. A primary role of the interliner is to inhibit localized erosion of the core 3. As described above, this is only an issue at strain levels below that necessary to promote recrystallization of the core 3, hence at low strain levels which generally translates to areas of the worked part that are minimally thinned (i.e., generally less than 20% reduction), and as such the interliner is also minimally thinned hence providing protection against localized core erosion.

The interliner may or may not be homogenized. If the interliner alloy contains Mn than it is generally preferred that the interliner be homogenized to avoid excessive erosion of the interliner and/or underlying core alloy in the formed part during the brazing event. Whatever the specific chemistry of the interliner alloy is, its microstructure must be resistant to localized erosion across a broad spectrum of strains during the brazing event. The composition of the interliner should be chosen such that the solidus of the interliner alloy is above 600° C. with alloys having higher solidus values preferred. If the solidus of the interliner is too low, the interliner may have difficulties surviving a braze cycle due to localized melting. When selecting a specific interliner chemistry, the effect of solute diffusing from the core and 4xxx braze cladding should be considered. For the above mentioned reasons, relatively pure interliners with relatively low levels of solute are preferred such that the solidus values of the interliners are above 630° C. and generally free from alloying elements forming dispersoids.

The metallurgical features influencing the inherent resistance of a material to localized erosion during brazing are well documented. In addition, the thickness and Si content of the 4xxx braze cladding 1 also influences the extent of localized erosion with lower Si contents generally preferred to minimize erosion. Furthermore, the actual brazing times and temperatures influence the localized erosion process as it is highly dependent on Si diffusion: as a general rule, longer times and higher superheat temperatures (i.e., temperatures above the liquidus temperature of the cladding) result in more erosion. It is well understood that brazing time above the solidus temperature of the braze cladding should be minimized (for most commercial 4xxx braze claddings this translates to minimizing the time above approximately 570° C.) to minimize localized erosion. Given this, there is no hard and fast absolute minimum thickness for an interliner. Short braze cycles with low peak temperatures and low Si claddings allow for thinner interliner(s). Likewise there is no hard and fast rule for maximum thickness although for practical considerations 60 μm can be considered an upper limit for interliners allowing for the development of a dispersoid band with suitable thicknesses of about 5–60 μm or about 15–45 μm or about 20–40 μm. For a typical vacuum brazing application employing an Al-12Si-0.2Mg braze cladding, 30–35 μm is sufficient thickness for many interliners. Nevertheless, it should be appreciated that the interliner 2 should be no thicker than necessary to largely mitigate localized erosion of the underlying core 3. In this way a generally continuous dispersoid band of Mn containing dispersoids can be generated within the core 3 at the core/interliner interface during a brazing cycle.

After brazing and concomitant partial erosion of the interliner 2, the electrochemical potential of the residual interliner (i.e., the interliner left after brazing) is also important in establishing good corrosion resistance. The interliner 2 should be anodic to the core 3 and preferably anodic also to the region occupied by the dense dispersoid band within the core 3 at the interliner/core interface. For example, the electrochemical potential difference between the core 3 and the interliner 2 is at least about 25 millivolts. Hence the relationship between the electrochemical potential of the core 3 and interliner 2 is very important. Additions to the core of Cu, Cr or Ag can be used to help ennoble the core (i.e., make the core more cathodic). Additions of Zn, In, or Sn may be used to make the interliner more anodic. It also should be noted that interdiffusion of solute occurs during brazing and as such the electrochemical potential relationships after brazing are important. In some cases, additions of Zn or In may be made to the 4xxx braze cladding 1 to also influence the post brazed electrochemical potentials.

For products requiring braze cladding on both sides of the brazing sheet (for example, plate type evaporator tubeplate), it may be beneficial to vary the chemical composition and thickness of the interliners. It may be desirable to increase the thickness of the second interliner 5 to over 60 μm (e.g., on the refrigerant side of a plate type evaporator tubeplate) to largely or mostly inhibit the formation of a dispersoid band as internal corrosion resistance is generally not a paramount issue. It may be further desirable to encourage the intermixing of solute during the braze cycle, primarily Mg, Si and Cu, in sufficient levels to promote a layer of the material that is locally age hardenable. By doing this, high post braze strengths are possible after allowing for aging.

The interliner 2 employed in this invention includes alloys which promote the formation of a dispersoid band in the core alloy at the interliner/core interface and the interliner 5 of the present invention may also be an alloy promoting the same or an alloy not promoting a dispersoid band. In general, the addition of dispersoid forming elements (Mn, Cr, V, Zr etc.) to either interliner type are generally discouraged as they tend to result in higher degrees of localized erosion in formed parts unless given homogenization treatments which, for economic reasons, are undesirable. This is not to say that interliners containing these alloying elements are excluded from consideration, just that their use is generally less desirable.

For interliners promoting the formation of a dispersoid band, the material should contain no more than about 0.9 wt. % Si (e.g., about 0.02–0.9 wt. % Si), no more than about 2 wt. % Mg, no more than 0.6 wt. % Fe and no more than about 1 wt. % Cu, with no purposeful additions of Cu above 0.5 wt. % preferred. The addition of Cu, Ag, Zn, In, or Sn is optional for the establishment of the appropriate electrochemical potential and potential difference between core and interliner alloys. The addition of Zr is optional up to about 0.2 wt. % and the addition of Mn is optional up to about 1.7 wt. %. The addition of Ti is optional up to about 0.25 wt. % (e.g., about 0.1–0.25 wt. % Ti). Interliners with Si contents up to 0.6 wt. %, Fe levels up to 0.6 wt. % with or without Cu, Zn or In for the establishment of a desired electrochemical potential (for corrosion) are especially useful for product to be brazed by vacuum or controlled atmosphere brazing (CAB) methods. Interliners with Si levels up to about 0.6 wt. %, Mg levels up to about 0.5 wt. %, Fe levels up to about 0.3 wt. % (e.g., about 0.15–0.3 wt. % Fe) with or without Zn, Cu or In for the establishment of a desired electrochemical potential (for corrosion) are especially useful for product to be brazed by vacuum processes. In one embodiment of the brazing sheet, the 4xxx braze cladding has no more than about 0.05 wt. % Mg, the interliner has no more than about 0.05 wt. % Mg and the core has no more than about 0.5 wt. % Mg. Whatever the specific chemistry of the interliner alloy is, its microstructure must be resistant to localized erosion across a broad spectrum of strains during the brazing event. The composition of the interliner should be chosen such that the solidus of the interliner alloy is above 600° C. with alloys having higher solidus values preferred. If the solidus of the interliner alloy is too low, the interliner 2 may have difficulties surviving a braze cycle due to localized melting. When selecting a specific interliner chemistry, the effect of solute diffusing from the core 3 and 4xxx braze cladding 1 should be considered. For the above mentioned reasons, relatively pure interliners with relatively low levels of solute are preferred such that the solidus values of the interliners are above 630° C. and generally free from alloying elements forming dispersoids.

For interliners not designed for the express purpose of forming a dense dispersoid band in the core at the core/interliner interface, the aluminum material may contain no more than about 0.9 wt. % Si (e.g., 0.02–0.9 wt. % Si), no more than about 0.6 wt. % Fe, no more than about 1 wt. % Cu (e.g., 0.2–1 wt. % Cu), no more than about 0.25 wt. % Ti (e.g., 0.1–0.2 wt. % Ti), and up to about 1.7 wt. % Mn. The addition of Mg is optional up to about 1 wt. % for products to be brazed via brazing process tolerant of Mg (e.g., vacuum brazing, CAB brazing with fluxes specifically designed to braze Mg bearing materials, etc.). The dense (Al—Mn—Si—Fe) band of dispersoids forms in the core at the core/interliner interface due to Si diffusion from the 4xxx cladding and potentially from the interliner (if the interliner contains Si). As such, it may be desirable to intentionally add Si to the interliner to promote a dense dispersoid band in the core at the core/interliner interface.

Table 1 is included as a summary of the suitable chemistries for the alloys of the core and for both types of interliners (i.e., those designed to promote formation of a dense band of Mn containing dispersoids in the core at the core/interliner interface and those designed to largely avoid the generation of a band of Mn bearing dispersoids). The preferred composition and preferred relative thickness of each layer of brazing sheet are summarized in Table 1, with more preferred ranges listed parenthetically beneath their respective, broader ranges.

TABLE 1

| | Interliner to generate a dispersoid band | Core layer | Second interliner (not generate dispersoid band) |
|---|---|---|---|
| Thickness at final gauge (μm) | 60 max (5-60) (20-40) | Balance | 60-100 (60) |
| Si | 0.9 max (0.02-0.9) (0.6 max) (0.4) | 0.18 max (0.11 max) (0.08 max) | 0.02-0.9 |
| Fe | 0.6 max (0.15-0.3) | 0.8 max (0.10-0.7) | 0.6 max (0.15-0.3) |
| Mn | 1.7 max | 0.5-1.6 (1-1.5) | 1.7 max |
| Cr | 0.3 max | 0.3 max Mn + Ti + Cr < 1.4 | 0.3 max |
| Cu | 1 max (0.01-1) | 1 max (0.01-1) (0.2-0.8) | 0.2-1 |
| Mg | Generally dependant on brazing practice | 0.01-1.5 | 1.0 max |
| Zn | Optional to establish e-chemical potential 2 max | 0.3 max | Optional to establish e-chemical potential 3 max |
| Ti | 0.25 max (0.1-0.25) | 0.25 max (0.1-0.25) | 0.25 max |
| Zr | 0.25 max | 0.25 max (0.02-0.25) | 0.25 max (0.1-0.2) |
| Other optional elements | V = 0.2 max In = 0.2 max | V = 0.2 max Ag = 0.01-1.0 | V = 0.2 max In = 0.2 max |
| Al and incidental impurities | Balance | Balance | Balance |

The 4xxx braze cladding 1 includes an alloy containing about 4–18 wt. % Si, up to about 0.5 wt. % Cu, up to about 2 wt. % Mg, up to about 0.3 wt. % Mn, up to about 0.8 wt. % Fe, up to about 1.5 wt. % Zn, up to about 0.2 wt. % Ti, and up to about 0.4 wt. % Bi. The cladding percentages for the braze cladding 1 is about 1–30% of the thickness of the product at final gauge. Where more than one braze cladding is present (e.g., FIG. 1c), the cladding percentages and chemistries of each cladding may be the same as or different from each other.

These sheet products may be fabricated via traditional roll bonding practices, or by continuous casting (one approach is described in U.S. Pat. No. 5,476,725) or by the practices described in U.S. Pat. No. 6,705,384 filed Oct. 23, 2001 entitled "Simultaneous Multi-Alloy Casting", incorporated herein by reference. If the practice described in U.S. Pat. No. 5,476,725 is employed, the 3xxx core alloy may be fed into the caster as a molten alloy and rapidly solidified against the surface of the interliner(s). Furthermore it may be convenient for the interliner and the 4xxx braze cladding to be pre-bonded as a composite sheet product and fed into the caster as the cladding. If the simultaneous multi-alloy casting practice is used, the interliner(s) described herein are used as the divider alloy(s) separating the 4xxx braze cladding and the 3xxx core alloy in the casting practice. The core may be about 60–98% of the thickness of the final product. The final gauge of the brazing sheet may be about 150–5000 μm.

Although the invention has been described generally above, the particular examples give additional illustration of the product of the present invention.

EXAMPLE 1

Figure 2:
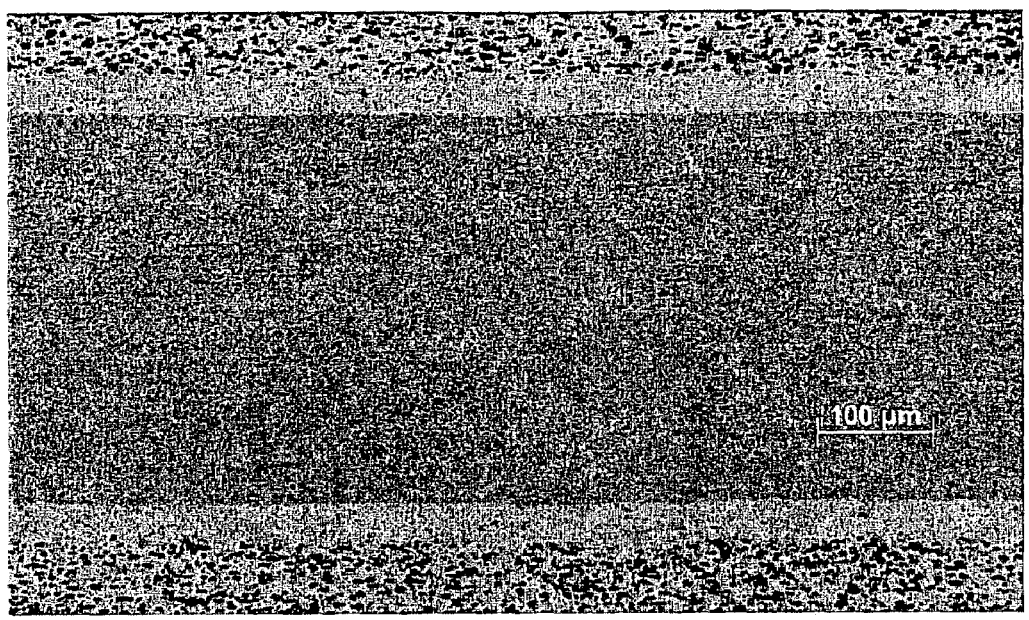
FIG. 2 is a photomicrograph of a cross section of a brazing sheet produced according to the present invention.

The following experiment demonstrates the importance of interliner chemistry and thickness on the successful generation of a continuous, dense Mn bearing dispersoid band in the core at the core/interliner interface. Five-layered brazing sheets made in accordance with the present invention were produced having layers with the compositions set forth in Table 2. The alloy combinations tested appear in Table 3 along with interliner thicknesses and data on localized erosion and whether or not a generally continuous dense dispersoid band was generated. After fabrication of the alloys in Table 3 to a fully annealed condition, evaporator tubeplates were stamped and subsequently brazed. These tubeplates, while smaller in total length than commercial evaporator tubeplates, have all the same basic forming features and to similar scale including deep cup draws, dimple draws, formation of the outer rails, etc. These tubeplates were formed to be able to examine a variety of strain levels representative of that seen commercially. After brazing, sections were taken from the tubeplates, mounted, polished, etched and examined. If the interliner was, at any point, unable to inhibit localized erosion of the core alloy leading to the concomitant lack thereof of a continuous and dense dispersoid band in the core at the core/interliner interface, then it was noted in Table 3. In some cases each side of the tubeplate was clad with differing interliner thicknesses to keep the number of fabricated brazing sheet composites to a minimum. An example of an etched cross section through the fully annealed (O-temper) as produced sheet is provided as a micrograph in FIG. 2.

It is clear from the data in Table 3 that interliners with thicknesses below 13 μm were too thin to protect the nonhomogenized core alloy from localized erosion (Composites F through L). It is also apparent that Mn additions to 1xxx alloys, even in relatively dilute levels (0.35 wt. % Mn in Alloy No. 7) negatively impacts the ability of the interliner to survive during brazing in composites where the interliner is not homogenized (compare composites D and E). It is also evident that Zr additions to 1xxx (0.18 wt. % in Alloy No. 5) also negatively impacts the ability of the interliner to survive a brazing cycle (although to a much lesser degree) in composites where the interliners were both homogenized and nonhomogenized (compare composites B, C and E). Comparing the results from Composites A, M, N and O suggests that 3xxx alloys can be used as interliners provided they are homogenized, thick enough and the 4xxx braze cladding to interliner thickness ratio is low enough. Regardless of what alloy is used as an interliner, or how that interliner is processed, it must be in a microstructural state that is resistant to localized erosion caused by Si diffusion from the 4xxx cladding during the brazing event. All of the above results suggest that the ideal candidate is an alloy that can recrystallize easily without fine intermetallic particles to provide the zener drag to dislocations and grain boundaries that inhibit recrystallization. This would further suggest that solid solution type alloying elements such as Si, Cu, Mg etc, provided they are present in relatively dilute levels, should not have significant deleterious effects to erosion of the interliner. See Example 2.

TABLE 2

| Alloy No. | Layer | Composition (wt. %) | | | | | | | | |
|---|---|---|---|---|---|---|---|---|---|---|
| | | Si | Fe | Mn | Cu | Mg | Zn | Ti | Zr | In |
| 1 | core | 0.06 | 0.17 | 0.92 | 0.29 | 0.24 | 0.0 | 0.18 | 0.0 | 0.0 |
| 2 | core | 0.06 | 0.17 | 0.90 | 0.49 | 0.13 | 0.01 | 0.17 | 0.00 | 0.0 |
| 3 | core | 0.05 | 0.15 | 0.89 | 0.53 | 0.01 | 0.01 | 0.18 | 0.00 | 0.0 |
| 4 | interliner | 0.05 | 0.20 | 0.01 | 0.01 | 0.01 | 0.01 | 0.005 | 0.0 | 0.0 |
| 5 | interliner | 0.12 | 0.19 | 0.05 | 0.06 | 0.01 | 0.03 | 0.02 | 0.18 | 0.0 |
| 6 | interliner | 0.19 | 0.46 | 0.98 | 0.00 | 0.02 | 0.65 | 0.016 | 0.0 | 0.0 |
| 7 | interliner | 0.26 | 0.27 | 0.35 | 0.00 | 0.01 | 0.00 | 0.165 | 0.0 | 0.0 |
| 8 | interliner | 0.10 | 0.16 | 0.00 | 0.01 | 0.05 | 1.0 | 0.01 | 0.10 | 0.0 |
| 9 | interliner | 0.08 | 0.20 | 1.02 | 0.23 | 0.04 | 0.02 | 0.02 | 0.0 | 0.0 |
| 10 | interliner | 0.88 | 0.45 | 1.17 | 0.22 | 0.03 | 0.02 | 0.18 | 0.0 | 0.0 |
| 11 | 4xxx braze clad | 10.0 | 0.15 | 0.03 | 0.02 | 0.02 | 0.01 | 0.01 | 0.0 | 0.0 |
| 12 | 4xxx braze clad | 12.0 | 0.20 | 0.05 | 0.05 | 0.18 | 0.08 | 0.02 | 0.0 | 0.0 |

TABLE 3

| Composite I.D. | Gauge (μm) | Alloys used from Table 2 | Actual Layer Thicknesses (μm) | Layer Homogenized? | Interliner Compromised? |
|---|---|---|---|---|---|
| A | 500 | 12/6/1/6/12 | 61/26/320/36/57 | yes/yes/no/yes/yes | yes |
| B | 505 | 12/5/1/5/12 | 52/25/332/36/60 | yes/no/no/no/yes | Rarely, at widely spaced locations |
| C | 500 | 12/5/1/5/12 | 63/25/320/37/55 | yes/yes/no/yes/yes | Rarely, at widely spaced locations |
| D | 515 | 12/7/1/7/12 | 62/30/324/37/62 | yes/no/no/no/yes | yes |
| E | 515 | 12/4/1/4/12 | 56/30/340/35/54 | yes/no/no/no/yes | no |
| F | 483 | 11/4/2/4/11 | 72/5/329/5/54 | yes/no/no/no/yes | yes |
| G | 483 | 11/4/2/4/11 | 71/7/325/7/73 | yes/no/no/no/yes | yes |
| H | 483 | 11/4/2/4/11 | 72/10/319/10/72 | yes/no/no/no/yes | yes |
| I | 483 | 11/4/2/4/11 | 72/13/313/13/72 | yes/no/no/no/yes | yes |
| J | 483 | 11/8/2/8/11 | 72/13/313/13/72 | yes/no/no/no/yes | yes |
| K | 483 | 11/8/2/8/11 | 72/13/313/13/72 | yes/yes/no/yes/yes | yes |
| L | 482 | 11/4/3/11 | 72/5/333/72 | yes/no/no/yes | yes |
| M | 483 | 11/9/1/9/11 | 50/40/305/41/47 | yes/yes/no/yes/yes | Rarely at widely spaced locations |
| N | 483 | 11/10/2/10/11 | 48/48/292/49/46 | yes/yes/no/yes/yes | No |
| O | 484 | 11/10/2/10/11 | 45/43/310/41/45 | yes/no/no/no/yes | Yes |

EXAMPLE 2

Figure 3:
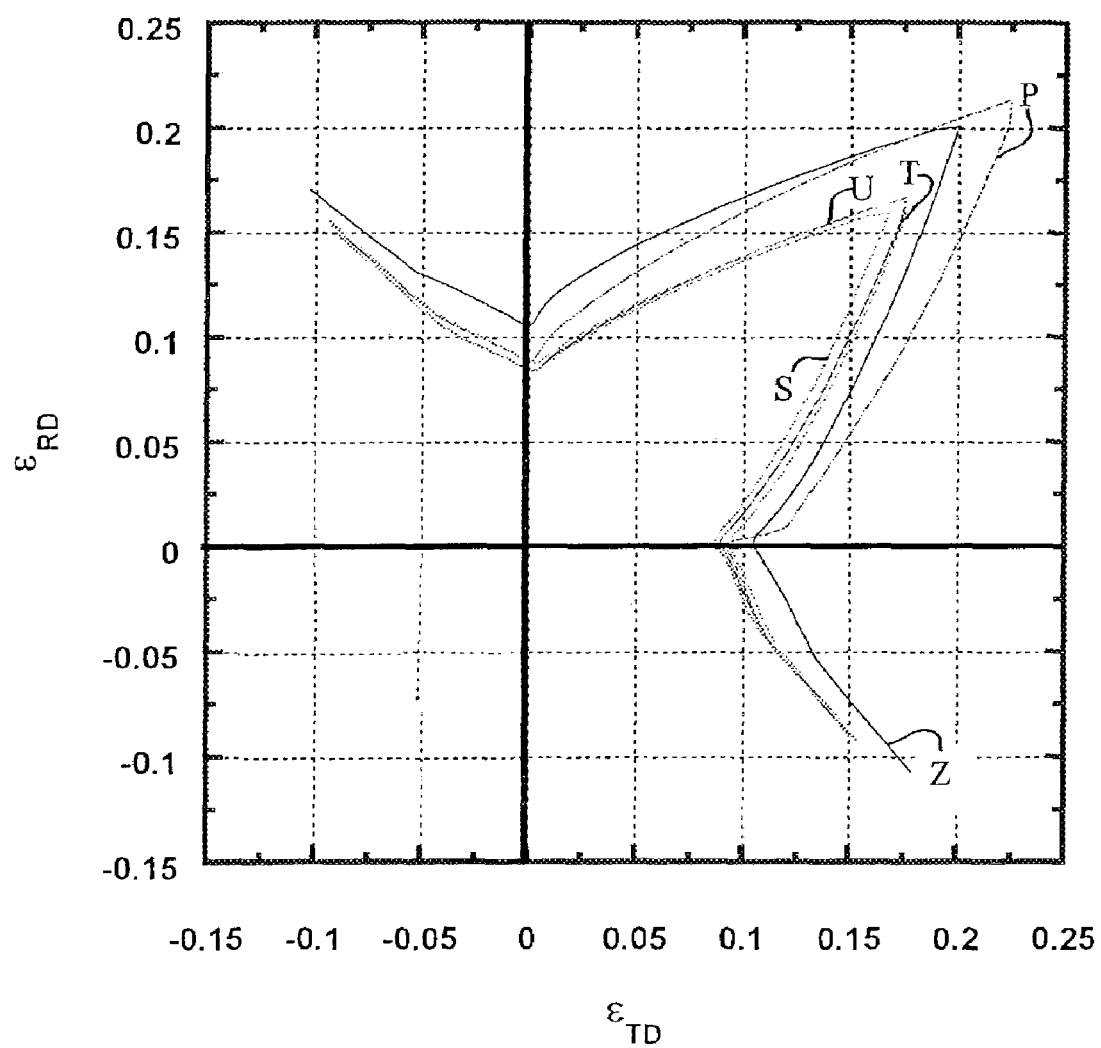
FIG. 3 is a graph of formability of brazing sheet of the present invention.
Figure 4:
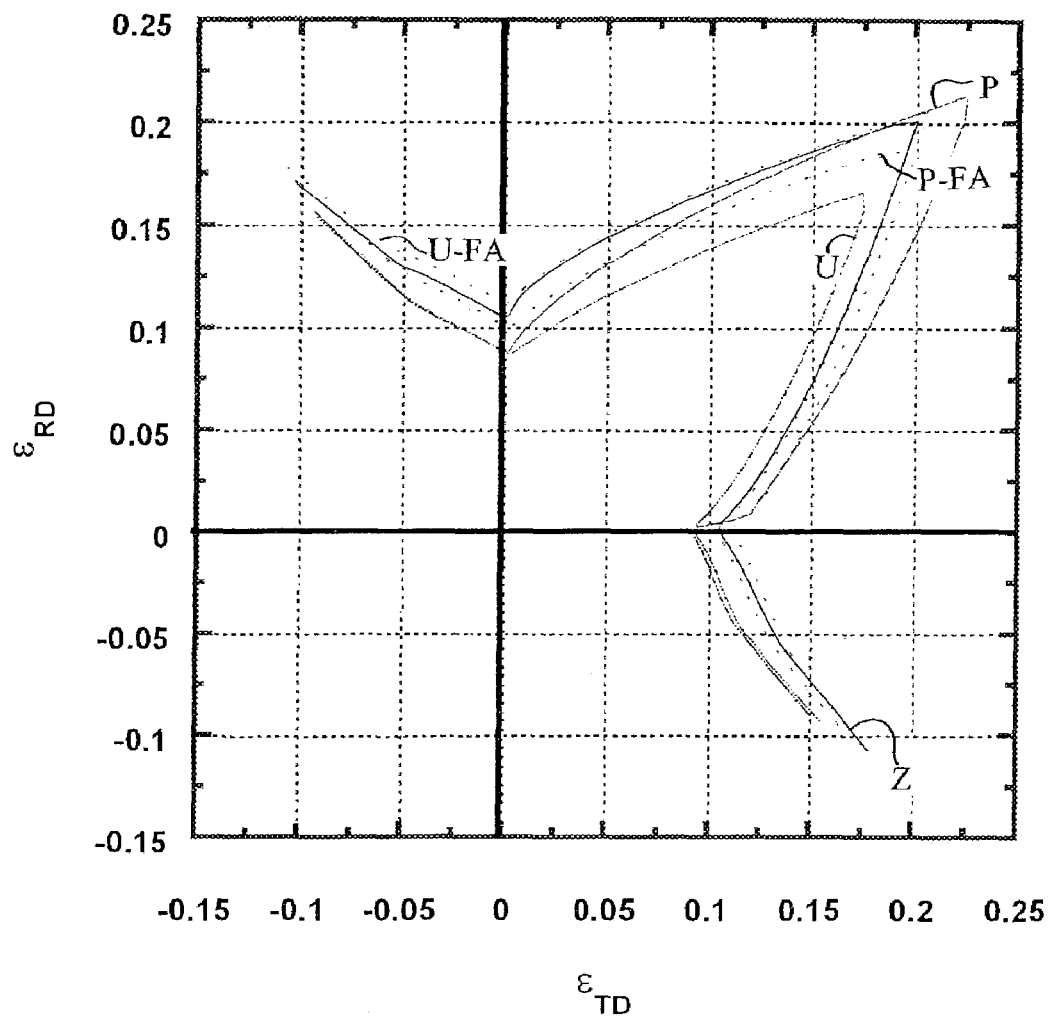
FIG. 4 is a graph of formability of brazing sheet of the present invention.

The following testing was performed to shed insight on the role of interliner/core combinations on pre-braze mechanical properties, formability properties and post braze properties such as 4xxx braze clad flow, localized erosion of the core alloy and corrosion resistance. The details of the pre-braze and post brazed materials are provided in Tables 4 through 7. The brazing cycle involved metal temperatures above 590° C. for 5 minutes with a peak temperature of 600° C. Formability was assessed via Olsen cup testing ASTM E-643 and forming limit diagrams (FLDs) were generated in FIGS. 3 and 4. Note that in two cases (samples P and U) alloys were annealed to O-temper using two different final annealing practices—a conventional type anneal and a flash anneal (noted hereinafter as "FA"). The flash anneal (i.e., rapid heat up through the recrystallization temperatures) resulted in a finer grain size for all layers of the composite alloy (4xxx cladding, interliner and core alloys). Hence, the impact of grain size could be separated from chemistry. The FLDs were calculated and generated off tensile property measurements of samples taken from the materials parallel to the rolling direction, along with 45° and 90° to the rolling direction. Information on three layer composite alloys are provided for reference purposes including a comparison to two three layer evaporator sheet composites with homogenized core alloys, currently used commercially, as well as a three layer composite with a nonhomogenized core. Five layer composites, of identical chemistry and cladding percentages were fabricated using a process route whereby one composite had a homogenized core alloy and one composite had a nonhomogenized core alloy. Homogenizing the core alloy greatly diminishes the density of the dispersoid band and as such the comparison of the corrosion performance illustrates the importance of the dense dispersoid band as a contributory element to the corrosion resistance. The information from testing is presented in Tables 4 through 6.

Figure 5:
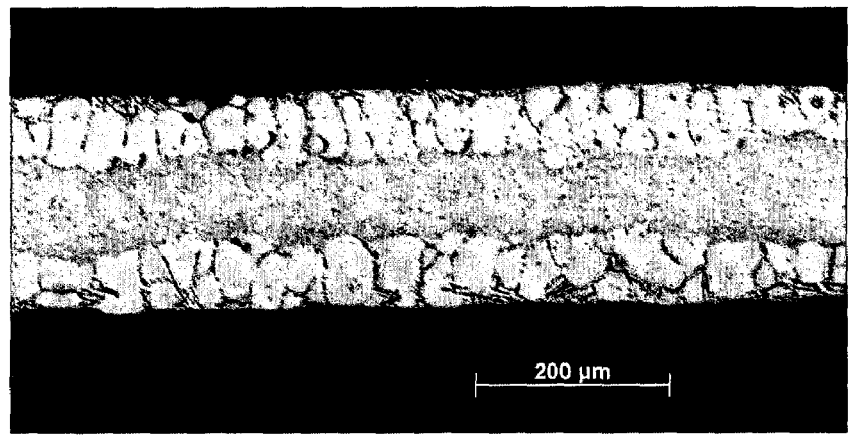
FIG. 5 is a photomicrograph of a cross section of —O temper brazing sheet made with an nonhomogenized core alloy and no interliner.
Figure 6:
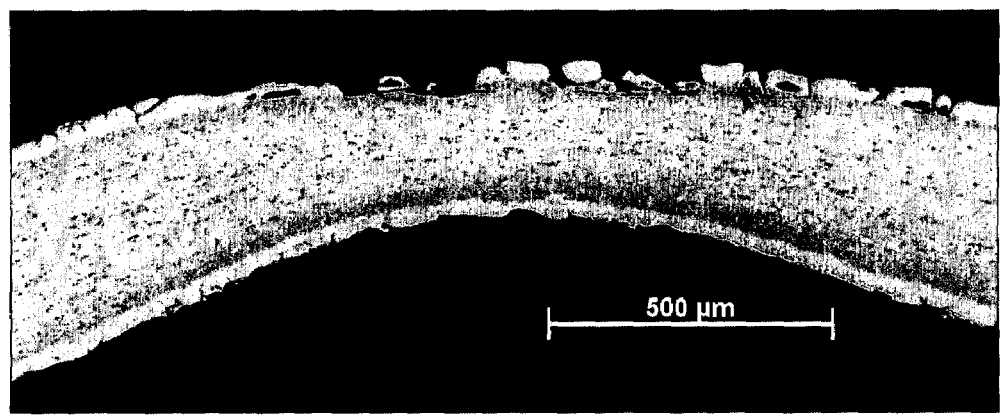
FIG. 6 is a photomicrograph of a cross section of brazing sheet of the present invention.

It is clear from this data that the use of an interliner between the 4xxx braze cladding and nonhomogenized core alloy clearly help with cladding flow (compare samples P through U with Y. Composite Y was highly susceptible to localized core erosion during brazing and poor cladding flow resulted. A cross section of the tubeplate after brazing is provided as FIG. 5 which shows an eroded core. A non-eroded core would otherwise have still occupied about 95% of thickness of the sheet. In contrast, FIG. 6 shows that the corrosion resistance is greatly enhanced with the presence of an interliner and the formation of a continuous dense dispersoid band within the core at the core/interliner interface, as can be clearly observed in FIG. 6. It is also apparent that braze cladding flow is similar between five layer composites U through Y (each having a nonhomogenized core alloy) and three layer composites where the core alloy was homogenized (X and Z).

A number of observations can be made from the calculated FLDs. First, a fine grain size is clearly important for good formability. For example, the average grain size of the core may be less than about 200 µm×300 µm×100 µm in the directions transverse to the rolling direction, parallel to the rolling direction and in the sheet thickness direction, respectively. Second, as a general trend, increasing the magnesium content tends to reduce the FLDs, particularly in the plane strain regime. Lastly, it is possible to achieve similar forming characteristics between a three layer material with a homogenized core (sample Z) and a five layer material, with a nonhomogenized core, even with higher magnesium content, provided that the grain size is sufficiently fine. This is evident by comparing the FLDs of sample Z and U-FA, as measured by these FLDs. Note also that alloy U and AA are clearly age hardenable, with a significant rise in yield and ultimate strengths after aging. It is also clear from the data that the corrosion resistance is greatly improved in the alloys with a thin interliner versus three layer alloys where the core was or was not homogenized. A cross section of sample P is provided as FIG. 6 which clearly shows that attack is limited to the anodic band on the surface after 14 days of SWAAT (sea water acetic acid) testing according to ASTM G-85.

Figure 7A:
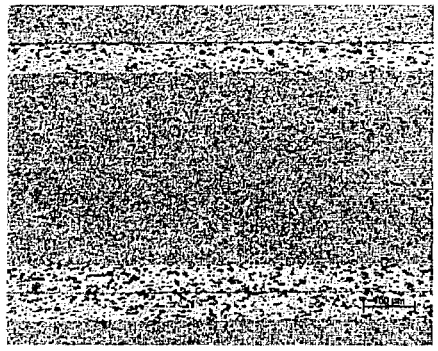
FIGS. 7a–7i and FIGS. 7j–7q are photomicrographs of a prior three later brazing sheet and a five layer brazing sheet of the present invention, respectively.
Figure 7J:
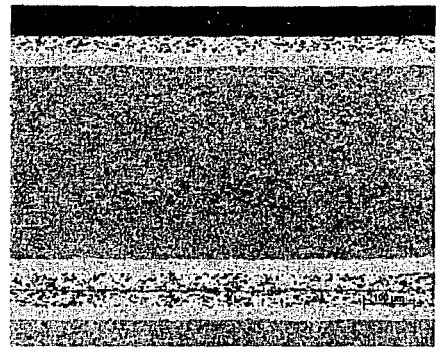
Figure 7B:
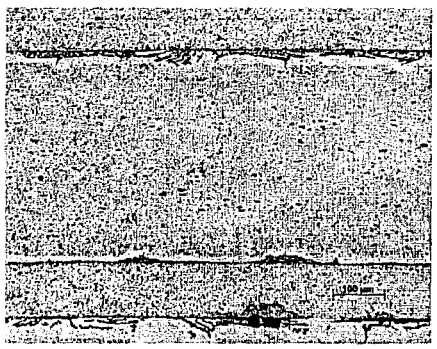
Figure 7K:
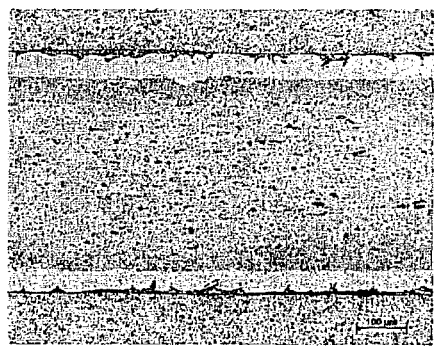
Figure 7C:
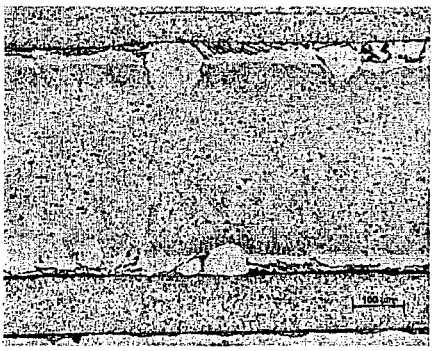
Figure 7L:
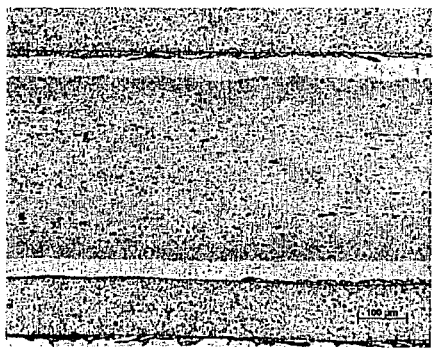
Figure 7D:
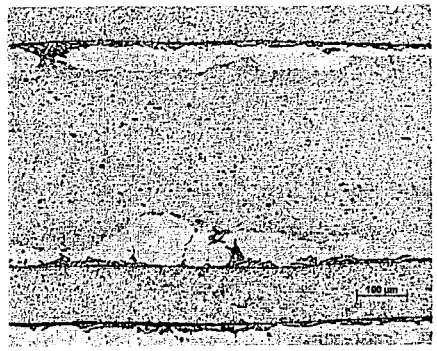
Figure 7M:
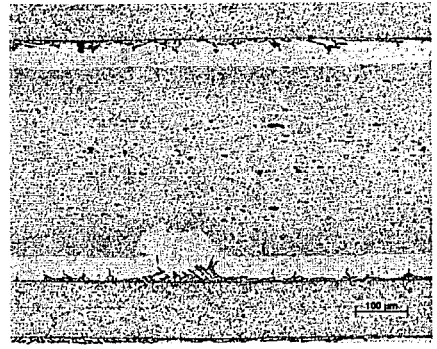
Figure 7E:
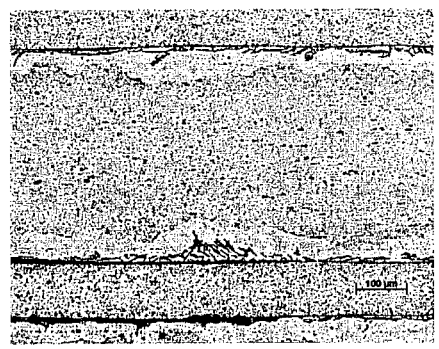
Figure 7N:
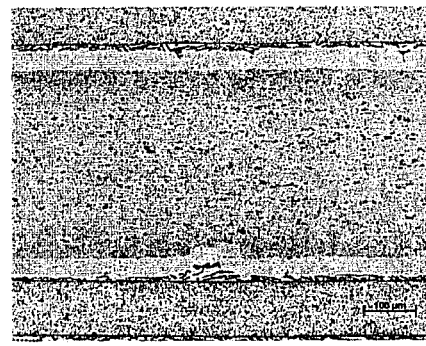
Figure 7F:
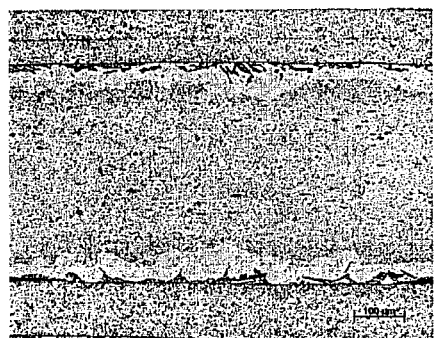
Figure 7O:
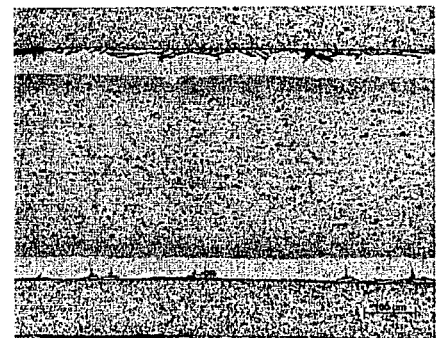
Figure 7G:
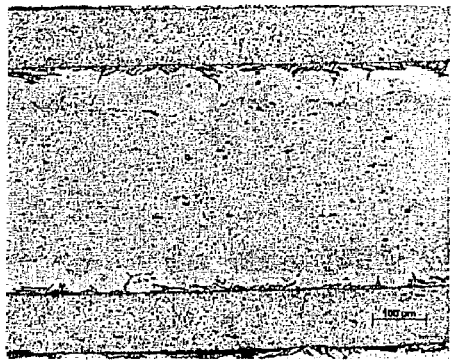
Figure 7P:
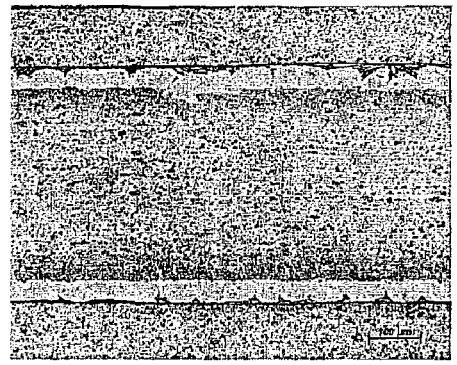
Figure 7H:
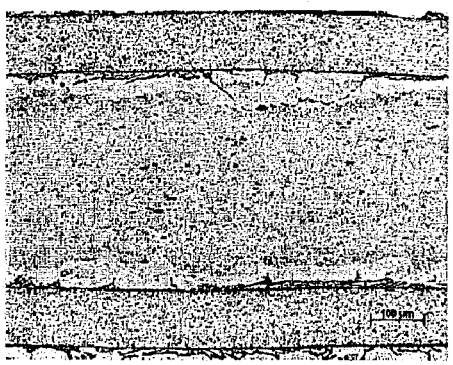
Figure 7Q:
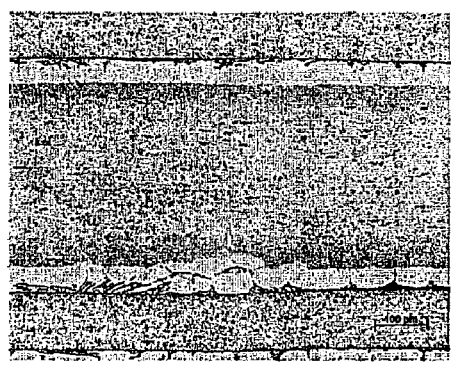
Figure 7I:
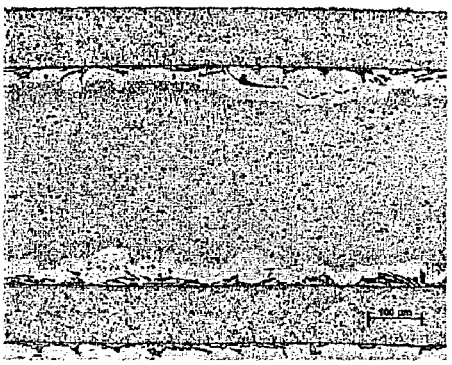

Lastly, it should be noted that in all samples P, Q, R, S, T, U, and AA there were small localized areas where erosion depth exceeded the initial interliner thickness. In none of these cases did it result in significant degradation of the dispersoid band in the underlying core. The extent of localized core erosion, across a broad range of applied strains, is approximately the same or better than the amount of localized core erosion in conventional brazing sheet alloys with a homogenized core alloy (and no interliner(s)). This is demonstrated in FIGS. 7*a*–*q* where the extent of post brazed localized core erosion is visually presented and compared between a five layer brazing sheet with nonhomogenized core (FIGS. 7*j*–7*q*) and a similar three layer alloy with a homogenized core (FIGS. 7*a*–7*i*) as a function of applied uniaxial strain from 0 to about 12–14%. It should be noted that erosion depth did not exceed the interliner in thickness in either of the flash annealed samples (P-FA or U-FA) even with the fine grain size of the interliners. The data also indicates that the best combination of corrosion resistance is obtained by multi-layer products that had a nonhomogenized core that generated a dense Mn containing dispersoid band at the core/interliner interface, with interliners and core alloys that had elevated levels of Ti (Samples P through U and AA versus samples V through Z). Multi-layer products with homogenized high Ti cores and interliners, displayed better corrosion resistance than did similar homogenized high Ti cores without interliners (samples U and V versus X) but multi-layer products with nonhomogenized high Ti cores and interliners had the best corrosion resistance (compare P through U and AA with W and V).

TABLE 4

| Alloy No. | Layer | Composition (wt. %) | | | | | | | | |
|---|---|---|---|---|---|---|---|---|---|---|
| | | Si | Fe | Mn | Cu | Mg | Zn | Ti | Zr | Bi |
| 13 | core | 0.06 | 0.17 | 0.92 | 0.29 | 0.24 | 0.0 | 0.18 | 0.0 | 0.0 |
| 14 | core | 0.06 | 0.18 | 1.01 | 0.25 | 0.25 | 0.0 | 0.01 | 0.0 | 0.0 |
| 15 | core | 0.03 | 0.30 | 0.99 | 0.26 | 0.48 | 0.0 | 0.175 | 0.0 | 0.0 |
| 16 | core | 0.03 | 0.31 | 1.0 | 0.49 | 0.49 | 0.0 | 0.185 | 0.0 | 0.0 |
| 17 | core | 0.08 | 0.41 | 0.97 | 0.51 | 0.23 | 0.02 | 0.15 | 0.0 | 0.0 |
| 18 | core | 0.10 | 0.45 | 0.98 | 0.53 | 0.49 | 0.02 | 0.16 | 0.0 | 0.0 |
| 19 | core | 0.04 | 0.31 | 0.99 | 0.25 | 0.72 | 0.0 | 0.18 | 0.0 | 0.0 |
| 20 | core | 0.05 | 0.17 | 1.08 | 0.52 | 0.22 | 0.02 | 0.16 | 0.0 | 0.0 |
| 21 | interliner | 0.05 | 0.20 | 0.01 | 0.01 | 0.01 | 0.01 | 0.005 | 0.0 | 0.0 |
| 22 | interliner | 0.12 | 0.19 | 0.05 | 0.06 | 0.0 | 0.03 | 0.02 | 0.18 | 0.0 |
| 23 | interliner | 0.59 | 0.20 | 0.03 | 0.04 | 0.40 | 0.02 | 0.175 | 0.0 | 0.0 |
| 24 | interliner | 0.44 | 0.19 | 0.0 | 0.01 | 0.0 | 1.43 | 0.170 | 0.0 | 0.0 |
| 25 | interliner | 0.39 | 0.20 | 0.03 | 0.04 | 0.40 | 0.02 | 0.175 | 0.0 | 0.0 |
| 26 | interliner | 0.40 | 0.15 | 0.01 | 0.01 | 0.01 | 0.02 | 0.01 | 0.0 | 0.0 |
| 27 | interliner | 0.41 | 0.16 | 0.01 | 0.01 | 0.41 | 0.02 | 0.01 | 0.0 | 0.0 |
| 28 | interliner | 0.40 | 0.18 | 0.05 | 0.10 | 0.03 | 0.05 | 0.05 | 0.0 | 0.0 |
| 29 | interliner | 0.35 | 0.18 | 0.05 | 0.20 | 0.03 | 0.05 | 0.05 | 0.0 | 0.0 |
| 30 | interliner | 0.40 | 0.18 | 0.05 | 0.10 | 0.30 | 0.05 | 0.05 | 0.0 | 0.0 |
| 31 | interliner | 0.35 | 0.18 | 0.05 | 0.20 | 0.30 | 0.05 | 0.05 | 0.0 | 0.0 |
| 32 | braze liner | 12.0 | 0.20 | 0.05 | 0.05 | 0.18 | 0.08 | 0.02 | 0.0 | 0.0 |
| 33 | braze liner | 10.0 | 0.20 | 0.01 | 0.01 | 0.01 | 0.01 | 0.02 | 0.0 | 0.0 |
| 34 | braze liner | 9.99 | 0.25 | 0.03 | 0.01 | 1.36 | 0.05 | 0.01 | 0.0 | 0.11 |

TABLE 5

| Composite I.D. | Gauge (µm) | Alloys used from Table 4 | Actual Layer Thicknesses (µm) | Layer Homogenized? | Interliner Compromised? |
|---|---|---|---|---|---|
| P | 483 | 32/21/13/21/32 | 53/31/304/32/63 | yes/no/no/no/yes | No |
| Q | 483 | 32/24/13/24/32 | 58/32/308/32/53 | yes/no/no/no/yes | No |
| R | 483 | 32/24/13/24/32 | 58/35/301/31/58 | yes/no/no/no/yes | No |
| S | 483 | 32/21/15/21/32 | 53/32/312/32/54 | yes/no/no/no/yes | No |
| T | 483 | 32/21/16/21/32 | 48/32/329/30/44 | yes/no/no/no/yes | No |
| U | 483 | 32/21/19/21/32 | 48/33/317/31/54 | yes/no/no/no/yes | No |
| V | 483 | 32/21/19/21/32 | 45/31/321/34/52 | yes/no/yes/no/yes | No |
| W | 483 | 32/21/16/21/32 | 47/29/317/32/58 | yes/no/yes/no/yes | No |

TABLE 5-continued

| Composite I.D. | Gauge (μm) | Alloys used from Table 4 | Actual Layer Thicknesses (μm) | Layer Homogenized? | Interliner Compromised? |
|---|---|---|---|---|---|
| X | 419 | 32/20/32 | 53/313/53 | yes/yes/yes | NA (not applicable) |
| Y | 480 | 32/14/32 | 58/365/57 | yes/no/yes | NA |
| Z | 483 | 32/14/32 | 58/366/59 | yes/yes/yes | NA |
| AA | 482 | 32/27/18/27/32 | 57/31/306/31/57 | yes/no/no/no/yes | No |

TABLE 6

| | 4xxx braze cladding flow (%) | Post-Brazed Properties (MPa) | | | | | | SWAAT TTP (days) |
|---|---|---|---|---|---|---|---|---|
| | | As-Brazed (AB) | | AB + 7 days @ RT | | AB + 25 min @ 218° C. | | |
| Composite I.D. | | TYS | UTS | TYS | UTS | TYS | UTS | |
| P | 60 | 53 | 141 | 54 | 142 | 55 | 143 | 60+ |
| Q | 74 | 55 | 144 | 55 | 144 | 54 | 141 | 60+ |
| R | 67 | 55 | 146 | 55 | 144 | 56 | 143 | 60+ |
| S | 61 | 60 | 155 | 60 | 155 | 59 | 155 | 60+ |
| T | 68 | 63 | 164 | 64 | 165 | 65 | 166 | 60+ |
| U | 63 | 62 | 163 | 66 | 167 | 68 | 169 | 60+ |
| V | 70 | 66 | 166 | 67 | 171 | 69 | 172 | 35 |
| W | 69 | 60 | 162 | 61 | 162 | 63 | 164 | 34 |
| X | 67 | 60 | 150 | 61 | 153 | 61 | 152 | 24 |
| Y | 12 | 58 | 158 | 58 | 156 | 58 | 159 | 2 |
| Z | 72 | 55 | 152 | 55 | 151 | 55 | 152 | 7 |
| AA | | 61 | 163 | 65 | 170 | 70 | 172 | 60+ |

TABLE 7

| Composite I.D. | O-temper grain size (approx.) (μm) | | O temper properties | | | Max Erosion Depth (μm) | Continuous Dispersoid Band? |
|---|---|---|---|---|---|---|---|
| | length | thickness | TYS (MPa) | UTS (MPa) | % el | Olsen (mm) | |
| P | 400 | 30 | 58 | 143 | 21 | 8.2 | 40 | moderate to strong |
| P-FA | 80 | 15 | 59 | 140 | 21 | 8.4 | 20 | moderate to strong |
| Q | 600 | 50 | 61 | 146 | 19 | 8.2 | 45 | moderate to strong |
| R | 400 | 40 | 61 | 143 | 19 | 8.2 | 40 | moderate to strong |
| S | 300 | 30 | 62 | 155 | 18 | 8.0 | 50 | moderate to strong |
| T | 300 | 30 | 64 | 161 | 18 | 7.9 | 70 | moderate to strong |
| U | 300 | 30 | 64 | 159 | 18 | 7.7 | 70 | moderate to strong |
| U-FA | 40 | 10 | 70 | 162 | 19 | 8.3 | 30 | moderate to strong |
| V | 250 | 50 | 64 | 165 | 22 | 8.2 | 50 | no |
| W | 300 | 50 | 55 | 159 | 22 | 8.3 | 60 | no |
| X | 150 | 50 | 62 | 145 | 21 | 8.1 | 45 | no |
| Y | 400 | 75 | 56 | 148 | 18 | 7.6 | 170 | no |
| Z | 300 | 50 | 54 | 145 | 22 | 8.1 | 30 | no |
| AA | 78 | 22 | 68 | 156 | 18 | 7.5 | 60 | moderate to strong |

The brazing sheet of the present invention is particularly suited for use as a tubeplate for a plate type heat exchanger, although it is particularly suitable for any application requiring high degrees of post-brazed corrosion resistance and pre-brazed formability.

What is claimed is:

1. A multi-layered brazing sheet comprising: a core comprising a 3xxx series alloy comprising less than 0.18 wt. % Si, up to about 0.8 wt. % Fe, about 0.5– to about 1.6 wt. % Mn, up to about 1.0 wt. % Cu, about 0.01 to about 1.5 wt. % Mg, up to about 0.3 wt. % Cr and up to 0.25 wt. % Ti; an aluminum alloy interliner having a thickness of less than 60 microns positioned on one side of said core, and a braze cladding comprising a 4xxx series alloy positioned on the other side of said interliner, wherein upon brazing of said sheet to a component, core develops a continuous dense Mn-containing dispersoid band at the interface between said core and said interliner resulting from diffusion of Si from said cladding into said core.

2. The brazing sheet of claim 1 wherein said 3xxx series alloy contains less than about 0.1 wt. % Si.

3. The brazing sheet of claim 1 wherein said interliner ranges from 14 to 45 μm thick.

4. The brazing sheet of claim 1 further comprising a second interliner positioned on the other side of said core and a second braze cladding positioned on the other side of said second interliner.

5. The brazing sheet of claim 4 wherein the thickness of each said braze cladding is about 1–30% of the thickness of the brazing sheet.

6. The brazing sheet of claim 4 wherein said interliners have different composition and/or thicknesses from each other.

7. The brazing sheet of claim 4 wherein said second interliner is thicker than 60 μm at final gauge.

8. The brazing sheet of claim 4 wherein said core at said interface with said second interliner does not develop a dense Mn containing dispersoid band.

9. The brazing sheet of claim 1 wherein said 4xxx alloy in said braze cladding comprises about 4–18 wt. % Si, up to about 0.5 wt. % Cu, up to about 2 wt. % Mg, up to about 0.3 wt. % Mn, up to about 0.8 wt. % Fe, up to about 1.5 wt. % Zn, up to about 0.2 wt. % Ti, and up to about 0.4 wt. % Bi.

10. The brazing sheet in claim 1 wherein said aluminum alloy interliner comprises up to about 0.9 wt. % Si, up to about 0.8 wt. % Fe, and up to about 1 wt. % Mg to about 1 wt. % Mg.

11. The brazing sheet of claim 10 wherein said the interliner alloy contains up to about 0.6 wt. % Si, up to about 0.6 wt. % Fe, about 0.01 wt. % to about 0.5 wt. % of Cu, up to about 1 wt. % of Zn, and up to about 0.2 wt. % of In.

12. The brazing sheet of claim 10 wherein said interliner alloy contains up to about 0.6 wt. % Si, up to about 0.3 wt. % Fe, up to about 0.4 wt. % Mg, up-to about 0.25 wt. % Ti, up to about 0.4 wt. % Cu, up to about 1.5 wt. Zn, up to about 0.2 wt. % In, up to about 0.2 wt. % V, and up to about 0.3 wt. % Cr.

13. The brazing sheet of claim 1 wherein said interliner contains up to about 1.7 wt. % Mn, up to about 2 wt. % Zn, up to about 0.2 wt. % In, up to about 0.25 wt. % Ti, up to about 1.0 wt. % Cu, up to about 0.25 wt. % Zr, and up to about 0.3 wt. % Cr.

14. The brazing sheet of claim 1 wherein said interliner is about 15–45 μm thick at final gauge.

15. The brazing sheet of claim 1 wherein said interliner is about 20–45 μm thick at final gauge.

16. The brazing sheet of claim 1 wherein said core comprises an aluminum alloy containing up to about 0.08 wt. % Si, up to about 0.7 wt. % Fe, about 1.0–1.5 wt. % Mn, about 0.2–0.8 wt. % Cu, about 0.01–1 wt. % Mg and up to about 0.25 wt-% Ti.

17. The brazing sheet of claim 1 wherein said core comprises an aluminum alloy containing up to about 0.11 wt. % Si, up to about 0.6 wt. % Fe, about 1.0–1.5 wt. % Mn, up to about 0.8 wt. % Cu, about 0.01–1 wt. % Mg and up to about 0.25 wt-% Ti.

18. The brazing sheet of claim 1 whereby said core is not thermally treated, homogenized or exposed to an extended pre-heat prior to being subjected to a brazing event.

19. The brazing sheet in claim 1 wherein the sheet is not thermally treated prior to being subjected to a brazing event.

20. The brazing sheet of claim 1 wherein said interliner is electrochemically more negative than said core after brazing.

21. The brazing sheet of claim 20 wherein the electrochemical potential difference between said core and said interliner is at least about 25 millivolts after brazing.

22. The brazing sheet of claim 1 further comprising a cladding of 1xxx, 3xxx, 5xxx, 6xxx, 7xxx or 8xxx alloy on the other side of said core.

23. The brazing sheet of claim 1 wherein said interliner is homogenized.

24. The brazing sheet of claim 1 wherein said interliner is not homogenized.

25. The brazing sheet of claim 1 wherein said core is about 60–98% of the thickness of the final product.

26. The brazing sheet in claim 1 wherein the average grain size of the core is less than about 200 μm×300 μm×100 μm in the directions transverse to the rolling direction, parallel to the rolling direction and in the sheet thickness direction, respectively.

27. The brazing sheet of claim 1 wherein the 4xxx braze cladding has no more than about 0.05 wt. % Mg, said interliner has no more than about 0.05 wt. % Mg and said core has no more than about 0.5 wt-% Mg.

28. The brazing sheet of claim 1 wherein said sheet is brazed and age hardened due to the interdiffusion of solute in said interliner and said core.

29. The brazing sheet of claim 1 wherein said sheet is brazed and aged to a tensile yield strength greater than 65 MPa and the ultimate tensile strength greater than 165 MPa.

30. The brazing sheet of claim 1 having a final gauge of about 150–5000 μm.

31. The brazing sheet of claim 1 having a post-brazed corrosion resistance greater than 20 days as measured by SWAAT testing according to ASTM G-85.

32. A brazed assembly comprising the brazing sheet of claim 1.

* * * * *

UNITED STATES PATENT AND TRADEMARK OFFICE
CERTIFICATE OF CORRECTION

PATENT NO. : 7,255,932 B1  Page 1 of 1
APPLICATION NO. : 10/417830
DATED : August 14, 2007
INVENTOR(S) : Raymond J. Kilmer It is certified that error appears in the above-identified patent and that said Letters Patent is hereby corrected as shown below:

In column 3, line 45, before "purposely" insert --be--.

In column 4, line 27, after "three", delete "later" and insert --layer--.

In column 6, line 3, after "thickness" insert --of--.

In column 6, line 34, after "Mn", delete "than" and insert --then--.

In column 16, line 21, line 3 of Claim 1, after "0.5" delete "-".

In column 17, line 25, line 3 of Claim 10, after "Mg" delete "to about 1 wt. % Mg".

In column 17, line 33, line 3 of Claim 12, after the second occurrence of "up" delete "-"

In column 17, line 34, line 4 of Claim 12, after "1.5 wt." insert --%--.

In column 17, line 50, line 5 of Claim 16, after "wt", delete "-" and insert --.--.

Signed and Sealed this

Twenty-seventh Day of November, 2007

JON W. DUDAS
*Director of the United States Patent and Trademark Office*